Feb. 6, 1951 W. M. OLIVER 2,540,282
GAUGE FOR INTERNAL TAPERS
Filed April 4, 1947
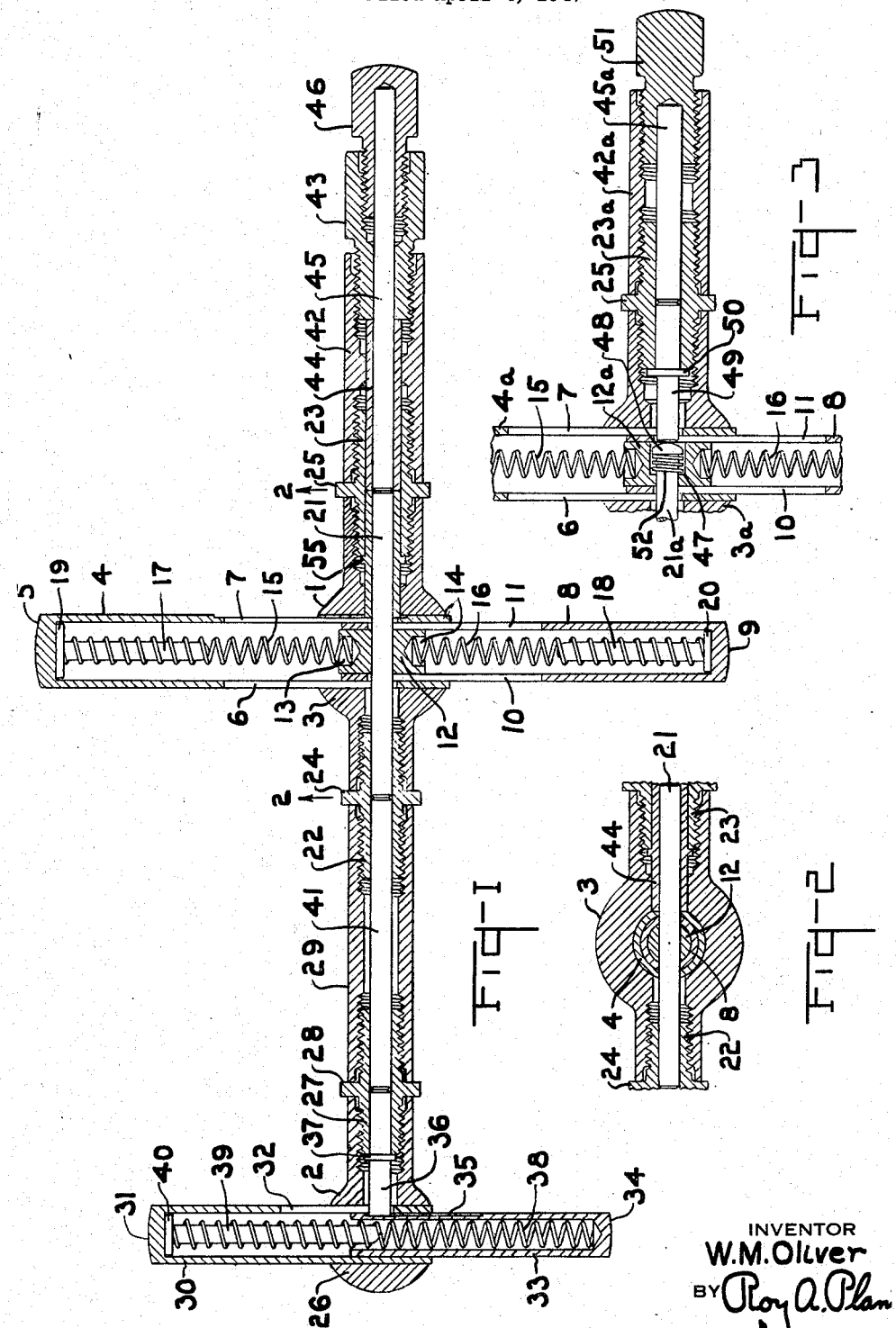
INVENTOR
W.M. Oliver
BY Roy A. Plan
ATTORNEY Patented Feb. 6, 1951

2,540,282

UNITED STATES PATENT OFFICE 2,540,282

GAUGE FOR INTERNAL TAPERS

William M. Oliver, Battle Creek, Mich.

Application April 4, 1947, Serial No. 739,466

15 Claims. (Cl. 33—174)

1

The present invention relates broadly to gages, and in its specific phases to a unit construction taper gage having two sets of spaced apart adjustable feelers.

Gaging of parts to close tolerances for accuracy of assembly, interchangeability, and quietness of operation as well as longer wear where relative movement is involved, is becoming increasingly common practice. The determination and gaging of single dimensions such as inside diameters has become relatively simple due to the use of telescoping gages, plug gages, snap gages, electrically operated gages, et cetera, but the accurate gaging of tapered bores has been very difficult, and perhaps the most common procedure followed in this case has been to use a pair of taper plugs of the "over" and "under" type with the taper being approved if it fell between them. That procedure did not determine what the actual taper was but rather that it fell within prescribed limits. It was a recognition of the difficulties involved in accurately measuring tapered bores, and the shortcomings of the prior art apparatus used for this purpose, which led to the conception and development of the present invention.

Accordingly among the objects of the present invention is the provision of a gage for use in accurately measuring internal tapers, wherein such gage has two sets of spaced apart, adjustable feelers which are mounted in substantially parallel planes.

Another object is to provide an internal taper gage with two sets of parallel, spaced apart, adjustable feelers of the telescoping type, wherein a separate means is provided for independently locking or releasing each set of adjustable feelers.

Another object is to provide a modified construction internal taper gage wherein a single locking and releasing operating member is adapted to lock or release first one and then the other of two sets of parallel, spaced apart, adjustable feelers.

A further object is to provide a taper gage which has self centering feelers.

A further object is to provide a taper gage having detachable and interchangeable parts and feeler subassemblies to facilitate gaging a wide range of tapered hole sizes and tapers.

A further object is to provide a taper gage having two sets of feelers mounted in parallel planes, with means passing through the first set for controlling the operation of the second set.

A further object is to provide a taper gage having two sets of parallel mounted telescoping feelers wherein both sets may be frictionally held

2 in various positions when the control means is tightened to hold same in position agreeing with the taper to be measured.

A further object is to provide a taper gage having two sets of parallel mounted telescoping feelers, wherein the set of feelers nearest the operating end of the gage has a spool member therein, and the means for locking and releasing the second set of feelers passes through said spool.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

Figure 1 shows a longitudinal center section view of a preferred form of the present invention.

Figure 2 shows a fragmentary longitudinal center section view of a portion of the Figure 1 assembly looking in the direction of the arrows 2—2 thereof.

Figure 3 shows a fragmentary longitudinal center section view of a modification of the Figure 1 assembly, and wherein a single control means is utilized for controlling the locking and releasing of both sets of feelers.

Referring more particularly to Figures 1 and 2 of the drawing it will be noted that the taper gage assembly has two sets of feeler subassemblies 1 and 2. Feeler subassembly 1 has a body member 3 which slidably receives hollow outer feeling 4, the outermost end 5 of which is suitably shaped for feeling purposes and is preferably in the form of a segment of a sphere. Diametrically opposite slots 6 and 7 preferably extend approximately one half the length of feeler 4 from a point near but spaced from the open end thereof. The outer face of feeler 4 at slot 7, in preferred construction, is also flattened as shown for a purpose to be hereinafter explained. Telescopically fitting into outer feeler 4 is an oppositely directed inner feeler 8, the outermost end 9 of which is suitably shaped for feeling purposes and is preferably in the form of a segment of a sphere of the same radius as end 5 of feeler 4. Inner feeler 8 is provided with diametrically opposite slots 10 and 11 which preferably extend approximately one half the length of feeler 8 from a point near but spaced from the open end thereof. Slidably fitting the inside of feeler 8 is a spool member 12 which is preferably provided with axially aligned depressions 13 and 14 for receiving the ends of the feeler projecting compression springs 15 and 16. In order to facilitate uniformly and axially applying projecting pressure on telescoping feelers 4 and 8, they are respectively supplied, in preferred construction, with concentrically mounted spring guide rods 17 and 18, which promote stability of spring movement with freedom from binding. These spring guide rods are preferably slightly smaller in diameter than the inside diameter of springs 15 and 16 when the latter are extended. In order to simplify centrally mounting rods 17 and 18, they may be provided respectively with concentric heads 19 and 20 which are just slightly smaller than the inside diameter of the respective feelers 4 and 8. For stability of assembly, heads 19 and 20 may be anchored to the inner face of ends 5 and 9 by spot welding or soldering. Spool member 12 is centrally cross bored for the reception of a push rod 21 which closely but freely fits said bore as well as slots 6, 7, 10, and 11 in feelers 4 and 8.

As viewed in Figures 1 and 2, body member 3 is counterbored and threaded at each end, perpendicular to feelers 4 and 8, for the threaded reception of tubular glands 22 and 23 which respectively have radially projecting center flanges 24 and 25. Body member 26 of subassembly 2 is bored and threaded at one side, perpendicular to feelers 30 and 33, for the threaded reception of tubular gland 27 which has a radially projecting center flange 28. Threadedly joining the adjacent but spaced apart threaded ends of tubular glands 22 and 27 is a sleeve member 29.

Feeler subassembly 2, as shown in Figure 1, is cross bored for a close but free sliding fit with outer feeler 30, the outermost end 31 of which is suitably shaped for feeling purposes and is preferably in the form of a segment of a sphere. A slot 32 preferably extends approximately one half the length of feeler 30 from a point near but spaced from the open end thereof. Telescopically fitting into outer feeler 30 is an oppositely directed inner feeler 33, the outermost end 34 of which is suitably shaped for feeling purposes and is preferably in the form of a segment of a sphere of the same radius as end 31 of feeler 30. Inner feeler 33 is provided on one side with a longitudinally flattened area 35 which has shouldered ends and preferably extends approximately one half the length of feeler 33 from a point near but spaced from the open end thereof. A short gripping push rod 36, slidably fitting tubular gland 27, extends from approximately the center thereof through close fitting slot 32 in outer feeler 30, and into engagement with inner feeler 33 at the flattened area 35 and between the shouldered ends of the latter. The gripping push rod 36 is preferably provided with a fixed collar 37 such that when feelers 30 and 33 are assembled as shown and tubular gland 27 tightly screwed into body member 26, collar 37 will prevent push rod 36 from moving out of a free but close sliding fit with flattened area 35 of inner feeler 33. This prevents accidental disengagement of inner feeler 33 from outer feeler 30 under conditions of use. Extending from end 34 of inner feeler 33 to end 31 of outer feeler 30 is a compression spring 38 which is slightly smaller in diameter when compressed than is in the inside diameter of inner feeler 33 thus facilitating free compression therein. In order to guide and control compression spring 38 in outer feeler 30, the latter is preferably provided with a spring guide rod 39 which has a centering head 40. For stability of assembly the latter may be spot welded or soldered to end 31 of outer feeler 30. Rod 39, to facilitate free movement of spring 38, is preferably a little smaller than the inside diameter of that spring when the latter is in extended position, and is of a length such that it reaches substantially to the middle of body member 26 when the outer feeler 30 is fully extended. Another push rod 41 slidably fits tubular glands 22 and 27 and abuts the adjacent ends of push rods 36 and 21 in manner filling the space therebetween.

Threadedly engaging the outer end of tubular gland 23 is a sleeve member 42 which is internally threaded at both ends and normally serves as a handle for the taper gage. A threaded end operating knob 43, which is preferably knurled on its periphery for ease of operation, engages the internal threads in the end of sleeve member 42 for reversible endwise movement thereon. An internal sleeve member 44 slidably fits tubular gland 23 and sleeve member 42, and may be of either one or two pieces as desired. This internal sleeve member, which has an inner diameter slightly larger than push rod 21, extends from the inner end of operating knob 43 to the flattened side of outer feeler 4 at slot 7 so that by tightening operating knob 43, the end of internal sleeve member 44 will be forced against the flattened side of feeler 4 and due to the close sliding fit of the parts, and the slight flattening of feelers 4 and 8, will lock this feeler assembly in the position at which the tightening takes place. In a modified construction, slot 7 may be made as wide as the diameter of sleeve 44 so that the end of the latter will contact inner feeler 8 and cause a direct binding action when knob 43 is tightened, and it is intended that the drawing be considered as diagrammatically illustrating this construction as well as the one previously described. Internal sleeve member 44 may be provided with a fixed location outward projecting collar 55 to hold same against loss in case operating knob 43 is removed.

Operating knob 43 is concentrically bored for push rod 45 while its outer end is counterbored and threaded for a second operating knob 46 which is preferably knurled on its periphery and fastened on the end of push rod 45. The tightening rotation of operating knob 46 moves push rods 45, 21, 41, and 36 endwise to frictionally grip and hold the feelers of feeler subassembly 2 in the position they were in when the tightening took place. It is thus to be seen that operating knob 43 controls the locking and releasing of the feelers of subassembly 1, while operating knob 46 independently controls the locking and releasing of the feelers of subassembly 2.

For ease of assembly and disassembly of the taper gage, flanges 24, 25, and 28 of tubular glands 22, 23, and 27 may be flattened on their opposite sides for engaging with a suitable wrench, and sleeve members 29 and 42 may be provided with flat spots in similar manner for the same purpose, and it is intended that the showing in the drawings be considered as diagrammatically illustrating this construction.

A modified construction of the taper gage, wherein both sets of feelers are controlled by a single operating knob, is illustrated in Figure 3 wherein the modified parts of the Figure 1 assembly are shown. Here the outer feeler 4a is the same as feeler 4 of Figure 1 except that the flat spot at the face of slot 7 may be omitted. Spool 12a is provided with a counterbore 47 adapted to receive head 48 of push rod 21a with a short relatively stiff compression spring 52 in the counterbore and under head 48. Threadedly engaging body 3a is tubular gland 23a with its radial flange 25. A short push rod 49 slidably fits tubular gland 23a and extends from approximately the center of same to head 48 of push rod 21a. Another short push rod 45a slidably fits tubular gland 23a and extends into a suitable socket in the inner end of operating knob 51 where it is preferably fastened in conventional manner. Sleeve member 42a is internally threaded at both ends and screwed on to tubular gland 23a at one end while operating knob 51 threadedly engages the other end.

With the modified construction shown in Figure 3, the tightening of operating knob 51 forces push rod 49 against head 48 of push rod 21a, and in compressing spring 52 forces spool member 12a sidewise to frictionally grip feelers 4a and 8 in place. Further movement of push rod 21a to the left further compresses spring 52 until gripping push rod 36, Figure 1, grips feelers 30 and 33 in place thus completing the locking of both feeler subassemblies in the position determined by the tapered bore being measured.

In actual use the taper gage would be provided with several different sizes of feeler subassemblies, and several different lengths of sleeve members 29 with corresponding length push rods 41 so that a wide variety of taper bore sizes could be measured. This measurement, following the choosing and assembling of the taper gage with the proper size units, would normally involve first compressing the feeler subassemblies and locking them in compressed position. The taper gage would then be inserted into the tapered bore and the feeler subassemblies released so that both sets of feelers would contact the walls of the tapered bore with the gage substantially coaxial thereof. The operating knob or knobs would then be tightened to lock the feelers in position corresponding with the taper. Then by measuring the distance across each set of feelers, and knowing the distance between the sets of feelers, the actual taper can be readily computed. In fact a table can be computed for different spacings of feeler sets so that it is only necessary to determine the difference in length of the two sets of feelers and then directly read from the table the taper dimension opposite the figure representing that difference in length.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A gage which comprises the combination of two sets of expansible feelers, a separate body member for each of said sets of feelers, hollow means for joining said body members and holding them in predetermined spaced relation with said feelers movable substantially radially of a line joining the center of each of said body members, a handle means extending from one of said body members substantially in line with said means for joining said body members, and means for releasing and locking the feelers of each set in various positions, a portion of the last named means passing through the set of feelers adjacent the handle to control the set of feelers remote from the handle, said sets of expansible feelers each having spring means for normally and independently urging the feelers into expanded position, and the set of feelers adjacent the handle means has a spool member therein and through which passes the control means for the remote set of feelers.

2. A taper gage which has two feeler assemblies, the first feeler assembly having a cross bored body member, said body member having an extending portion on one side, a tubular construction outer feeler closely but slidably fitting the cross bore in said body member, said outer feeler having a longitudinal slot in one side extending approximately one half its length starting at a point near but spaced from the open end thereof, a tubular construction inner feeler closely but slidably fitting into said outer feeler, said inner feeler having a flat side extending approximately one half its length starting at a point near but spaced from the open end thereof, said flat side being under said slot of the outer feeler, both of said feelers having their outer ends closed and conventionally curved for feeling purposes, and a compression spring within said inner and outer feelers, said compression spring extending from closed end to closed end thereof in manner normally urging said feelers to outermost position, the second feeler assembly having a cross bored body member, said body member having a pair of oppositely extending portions, means for rigidly joining the adjacent projecting sides of said body members, said second feeler assembly having telescoping feelers similar to the first but which are longitudinally slotted in alignment part of their length starting near their open end, springs for normally projecting said feelers in an outward direction, a cross bored spool member between said springs, a handle projecting from said second body member in alignment with the means joining said body members, means with an operating knob at the end of said handle member for releasably locking the feelers of said first feeler assembly in various positions, said means extending through said spool and feeler slots to said first feeler assembly, and a separate means with knob for releasably locking the feelers of said second feeler assembly in various positions.

3. A taper gage which has two feeler assemblies, the first feeler assembly having a cross bored body member, said body member having an extending portion on one side, a tubular construction outer feeler closely but slidably fitting the cross bore in said body member, said outer feeler having a longitudinal slot in one side extending approximately one half its length starting at a point near but spaced from the open end thereof, a tubular construction inner feeler closely but slidably fitting into said outer feeler, said inner feeler having a flat side extending approximately one half its length starting at a point near but spaced from the open end thereof, said flat side being under said slot of the outer feeler, both of said feelers having their outer ends closed and conventionally curved for feeling purposes, and a compression spring within said inner and outer feelers, said compression spring extending from closed end to closed end thereof in manner normally urging said feelers to outermost position, the second feeler assembly having a cross bored body member, said body member having a pair of oppositely extending portions, means for rigidly joining the adjacent projecting sides of said body members, said second feeler assembly having telescoping feelers similar to the first but which are longitudinally slotted in alignment part of their length starting near their open end, springs for normally projecting said feelers in an outward direction, a cross bored spool member between said springs, a handle projecting from said second body member in alignment with the means joining said body members, and means with a single operating knob at the end of said handle member for releasably locking the feelers of both first and second feeler assemblies in various positions, the portion of said locking means extending to said first feeler assembly passing through the cross bore of said spool member and the slots in said feelers of the second feeler assembly.

4. A gage, which comprises the combination of two expansible feeler assemblies, each of which has a pair of telescoping members, an elongated spacer for holding said feeler assemblies in spaced apart substantially parallel planes, and an elongated device for releasably locking said telescoping members of both feeler assemblies in various positions.

5. A gage, which comprises the combination of two expansible feeler assemblies with each of said assemblies including a pair of telescoping members and a body member, an elongated spacer for joining said body members and holding them in predetermined spaced relation with said telescoping members expansible substantially radially of a line joining the center of each of said body members, and an elongated device for releasably locking said telescoping members of both feeler assemblies in various positions from retracted to fully expanded.

6. In a gage as set forth in claim 5, wherein the outer member of each pair of said telescoping members slidably fits the corresponding body member, said elongated spacer is tubular, and a portion of said elongated device for releasably locking said telescoping members passes through said tubular spacer.

7. In a gage as set forth in claim 5, wherein said elongated spacer extends in a substantially straight line from center to center of said body members, the outer of said telescoping members of each feeler assembly slidably fits the corresponding body member, and each pair of telescoping members has at least one spring which makes them self-expanding and substantially self-centering relative to the body member of that pair.

8. A gage, which comprises the combination of two expansible feeler assemblies, a separate body member for each of said feeler assemblies, a pair of inner and outer telescoping feelers in each of said assemblies, an elongated hollow spacer for joining the adjacent sides of said body members and holding them rigidly in predetermined spaced relation with said telescoping feelers movable substantially radially of a line joining the center of each of said body members, the outer feeler of each pair slidably fitting its body member, the inner feeler of each pair slidably fitting into the corresponding outer feeler, at least one compression spring in each feeler assembly for normally urging the telescoping feelers of each pair in outward direction on opposite sides of said center line, and an elongated device for releasing and locking the telescoping feelers of each pair in various positions.

9. A gage, which comprises the combination of two expansible feeler assemblies, a separate body member for each of said feeler assemblies, a pair of inner and outer telescoping feelers in each of said assemblies, an elongated tubular spacer for joining said body members and holding them rigidly in predetermined spaced relation with said telescoping feelers movable substantially radially of a line joining the center of each of said body members, the outer feeler of each pair slidably fitting its body member, the inner feeler of each pair slidably fitting the corresponding outer feeler, at least one compression spring in each feeler assembly for normally urging the telescoping feelers of each pair in outward direction on opposite sides of said center line, a handle extending from one of said body members substantially in line with said spacer which joins said body members, and a device extending through said handle and said tubular spacer, said device having an actuatable end portion for both releasing and locking the feelers of each pair in various positions.

10. A gage as set forth in claim 9, wherein said device for releasing and locking the feelers of each set in various positions extends through said handle, and is provided with knob means for actuating same.

11. A gage, which comprises the combination of two expansible feeler assemblies, a separate body member for each of said feeler assemblies, an elongated hollow spacer for joining said body members and holding them in predetermined spaced relation with said feelers of each assembly being coaxial and movable substantially radially of a line joining the center of each of said body members, a hollow handle extending from one of said body members substantially in line with said spacer which joins said body members, and a device with actuatable end portion for both releasing and locking the feelers of each feeler assembly in various positions, a portion of the last named device passing through said hollow handle, feeler assembly and body member adjacent the handle, and hollow spacer to control the feelers in the body member remote from the handle.

12. A gage as set forth in claim 11, wherein each of said expansible feeler assemblies has at least one compression spring within the feelers for normally urging the feelers into expanded position.

13. A taper gage, which comprises the combination of two feeler assemblies, at least one of which has a pair of telescoping members which make it expansible, an elongated spacer for fixed space joining said feeler assemblies, and a device with actuatable end portion for both releasing and locking said telescoping members in various positions from fully retracted to fully expanded.

14. A taper gage, which comprises the combination of two feeler assemblies, at least one of which is expansible, an elongated spacer for rigidly joining said feeler assemblies and holding them in substantially parallel planes, said expansible feeler assembly having a pair of telescoping feelers with the smaller closely but slidably fitting into the larger, said feelers being coaxial and extending on opposite sides of said rigid spacer, a device with actuatable end portion for both releasing and locking the expansible feelers in various positions, and a handle extending from one of said sets of feelers substantially in line with the elongated spacer joining said sets of feelers, said handle supporting the actuatable end of said feeler releasing and locking device.

15. A taper gage, which comprises the combination of two feeler assemblies, at least one of which is expansible, an elongated hollow spacer for rigidly joining said feeler assemblies and holding them in substantially parallel planes, said expansible feeler assembly having a body member, an outer feeler slidably fitting said body member, an inner feeler slidably fitting into said outer feeler, and at least one compression spring normally urging said feelers into an expanded position, said inner and outer feelers being coaxial with the projecting ends of said feelers extending on opposite sides of said spacer for said feeler assemblies, a hollow handle extending from the body member of said expansible feeler assembly substantially in line with the elongated hollow spacer joining said feeler assemblies, and a device with actuatable portion for both releasing and locking the expansible feelers in various positions, said releasing and locking device being mounted on and passing through said hollow handle.

WILLIAM M. OLIVER.

REFERENCES CITED

The following references are of record in the file of this patent:

UNITED STATES PATENTS

| Number | Name | Date |
| --- | --- | --- |
| 1,329,456 | Carpenter | Feb. 3, 1920 |
| 1,860,640 | Witchger | May 31, 1932 |
| 2,121,614 | Stark | June 21, 1938 |
| 2,314,480 | Clark | Mar. 23, 1943 |
| 2,361,336 | Volis | Oct. 24, 1944 |
| 2,405,648 | Gray | Aug. 13, 1946 |
| 2,425,216 | West | Aug. 5, 1947 |